United States Patent [19]

Nakamura et al.

[11] 4,341,542
[45] Jul. 27, 1982

[54] MANUFACTURING METHOD OF GLASS FOR OPTICAL TRANSMISSION BODY

[75] Inventors: Osamu Nakamura, Akashi; Takeshi Akamatsu, Kobe; Junjiro Goto, Takasago, all of Japan

[73] Assignee: Fujitsu Limited, Kanagawa, Japan

[21] Appl. No.: 231,980

[22] Filed: Feb. 6, 1981

[30] Foreign Application Priority Data

Feb. 8, 1980 [JP] Japan .................................. 55-15041

[51] Int. Cl.³ .......................... C03C 3/16; C03C 3/30
[52] U.S. Cl. ...................................... 65/17; 65/3.11; 501/12; 501/42; 501/45
[58] Field of Search ................ 65/3.12, 18.2, 17, 3.11; 427/163; 501/12, 42, 45

[56] References Cited

U.S. PATENT DOCUMENTS

4,197,136  4/1980  Inoue et al. ....................... 65/3.12 X

Primary Examiner—Richard V. Fisher
Attorney, Agent, or Firm—Daniel Jay Tick

[57] ABSTRACT

A method of manufacturing glass for an optical transmission body includes the steps of precipitating an oxide of a glass forming element by the hydrolysis reaction of a halogen compound of the glass forming element in the liquid phase, adding phosphoric acid to the precipitate to produce a phosphate, removing the water from the phosphate and vitrifying the phosphate by heating.

5 Claims, 6 Drawing Figures

MANUFACTURING METHOD OF GLASS FOR OPTICAL TRANSMISSION BODY

BACKGROUND OF THE INVENTION

The present invention relates to glass for an optical transmission body. More particularly, the invention relates to a method of manufacture of glass for optical fiber, consisting principally of a phosphate or phosphates.

Phosphate glass, which is mainly composed of the oxides of three kinds of elements such as phosphorum (P), gallium (Ga) and germanium (Ge) is well known as optical fiber glass. This glass is superior in optical characteristic and shows lower fusing temperature, compared with glass which consists principally of silica, more specifically, silicon dioxide ($SiO_2$), and is, furthermore, acidic. For this reason, this glass material is just suitable for use as an optical fiber due to spinning by the vessel fusing method utilizing a quartz vessel. Furthermore, the use of this glass material assures an economical supply of optical fibers.

This aforedescribed phosphate glass has been manufactured by a method wherein fine powder of a glass forming oxide, more particularly, soot, is first produced by a gas phase chemical reaction and the fine powder is then gathered in the vessel and vitrified in a heating and fusing process. The gas phase chemical reaction is utilized in the conventional method, as hereinbefore explained, because the soot produced has excellent purity and, in addition, the loss of phosphorum is comparatively low.

A liquid halogen compound of the glass forming element such as phosphorum is used as the starting raw material for the formation of such soot by the aforementioned gas phase chemical reaction. The compounds ordinarily used are phosphorum oxychloride ($POCl_3$), gallium trichloride ($GaCl_3$) and germanium tetrachloride ($GeCl_4$). These compounds are vaporized and supplied to a reaction tube as a mixture with a carrier gas for oxidation under a high temperature. Thereby, the chlorine (Cl) is separated as chlorine gas ($Cl_2$), and the phosphorum, gallium and germanium combine with the oxygen to enable the soot to be obtained. The soots are gathered in a quartz vessel and fused by a heating process, so that said soots are vitrified. Therefore, the lower part of the vessel is previously formed in the shape of a nozzle and is closed until vitrification is completed. When vitrification is completed, the temperature is lowered a little while the soot is in liquid condition. The glass fiber, more particularly the optical fiber, may then be obtained by releasing the glass material through the nozzle end of the vessel.

Another well known method of manufacturing glass material consisting of respective oxides of phosphorum, gallium and germanium considers the fact that the gallium forms a very stable phosphate of gallium phosphate ($GaPO_4$) by reacting with phosphoric acid. In this method, the soot of $GaPO_4$ is obtained by the flame hydrolysis method of placing both $POCl_3$ and $GaCl_3$ in an oxyhydrogen flame in a vaporized condition. The soot consisting of the complex oxide of $P_2O_5$ and $GeO_2$ is mixed with the soot of $GaPO_4$ and these soots are heated and fused. In this method, the phosphorum is in the forms of $GaPO_4$ and $GeP_2O_7$, so that, as a result, the loss of phosphorum by vaporization can be kept very low.

The aforedescribed two method have common disadvantages. Specifically, it is difficult to control the component ratio of soot and the soot formation rate is low. In other words, the controlling of soot formation by gas phase chemical reaction is difficult, because the reaction occurs for a very short time in the flame, showing an unstable thermal characteristic, and, in addition, the reaction rate is low, based on the essential nature of gas phase reaction. As a result; soot of only several tens of grams can be obtained by a reaction lasting as long as an hour. Furthermore, part of the halogen compound used as the raw material is exhausted from the vessel while it is in non-reacted condition. As a result, the yield is low.

The aforedescribed disadvantages prevent mass-production and economical production of optical fiber.

The principal object of the invention is to provide a method of manufacture of glass for optical fiber, which method provides a high yield.

An object of the invention is to provide a method of manufacture of glass for optical fiber, which method prevents loss of phosphorum due to vaporization.

Another object of the invention is to provide a method of manufacture of glass for optical fiber, which method provides glass-forming compounds with extraordinarily high efficiency.

Still another object of the invention is to provide a method of manufacture of glass for optical fiber, in which method the glass-forming oxide is provided by a liquid phase reaction, so that the reaction occurs at a low temperature, the yield is high, and a large amount of glass-forming oxides can be manufactured by the reaction in a short period of time.

BRIEF SUMMARY OF THE INVENTION

In accordance with the invention, a method of manufacturing glass for an optical transmission body comprises the steps of precipitating an oxide of at least one glass forming element by the hydrolysis reaction of a halogen compound of the glass forming element in the liquid phase to provide a precipitate, producing a phosphate including the glass forming element by adding a liquidous phosphoric acid to the precipitate to provide a product, removing the water from the product containing the phosphate, and thereafter vitrifying the phosphate by heating.

The glass forming element is selected from the group constituting gallium, germanium and silicon.

The phosphoric acid is obtained by removing hydrogen halogenide from the reaction product of the hydrolysis of a halogen compound of phosphorum, and adding the phosphoric acid to the precipitate of the reaction.

Halogen compounds of silicon and germanium are mixed, to provide a mixture, prior to the precipitating of the oxide, and the precipitating of the oxide is by the hydrolysis reaction of the mixture in the liquid phase.

In accordance with the invention, a method of manufacturing glass for an optical transmission body, the method utilizing a reaction vessel, comprises the steps of producing gallium hydroxide by adding ammonia to an aqueous solution of gallium trichloride, producing a hydrated oxide of a semiconductor element by the hydrolysis reaction of a halogen compound of the semiconductor element in the liquid phase, mixing the hydrated oxide of the semiconductor element and the gallium hydroxide by producing the hydrated oxide of the semiconductor element and the gallium hydroxide in the reaction vessel to provide a mixture, producing phosphates of the gallium hydroxide and the hydrated oxide of the semiconductor element by adding liquidous phosphoric acid to the mixture to provide a product, removing the water from the product containing the phosphates, and thereafter vitrifying the phosphates by heating.

BRIEF DESCRIPTION OF THE DRAWINGS

In order that the invention may be readily carried into effect, it will now be described with reference to the accompanying drawings, wherein.

DETAILED DESCRIPTION OF A PREFERRED EMBODIMENT OF THE INVENTION

Figure 1:
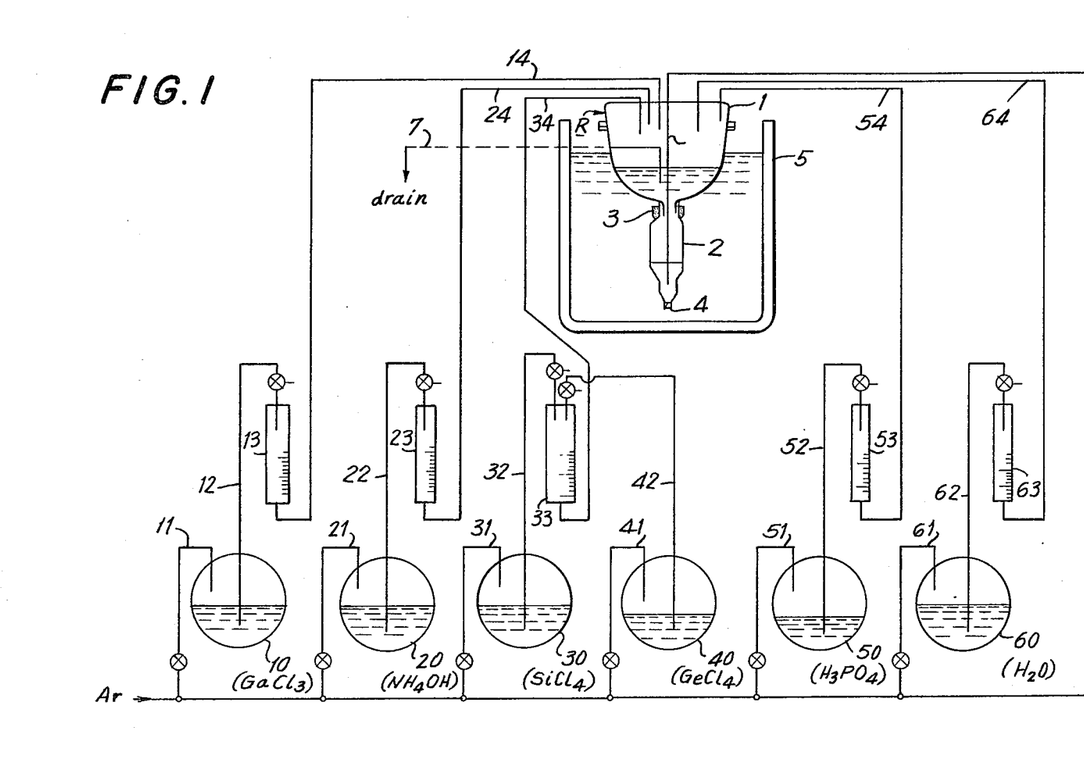
FIG. 1 is a schematic diagram of an embodiment of apparatus used in the method of the invention.

In FIG. 1, which shows an embodiment of apparatus used in the method of manufacture of the invention, all reactions hereinafter explained are carried out in a reaction vessel R, housed in a thermostat. The structure of the reaction vessel R has an upper part 1 of large volume and a lower part 2, which is also used as a glass fusing vessel, and is coupled to said upper part by a joint 3. The lower end of the lower part 2 is closed by a cover 4. An argon (Ar) introduction tube 6 for stirring is inserted into the lower part 2. A plurality of liquid vessels 10, 20, 30, 40, 50 and 60 respectively contain the liquids used as the raw materials or the liquids which react with $GaCl_3$, $NH_4OH$, $SiCl_4$, $GeCl_4$, $H_3PO_4$ and $H_2O$, respectively, as indicated in parentheses. However, the liquid vessels contain the aqueous solutions and each liquid vessel is provided with a pressured gas leading pipe and a liquid leading pipe. Each liquid leading pipe is connected to the raw material leading pipe guided to the reaction vessel R via a corresponding gauge. These pipes and gauges are identified by codes which are respectively common in their tens digits to the codes identifying the liquid vessels containing the raw material of glass, hereinafter referred to as the raw material vessels. Thus, for example, the gas leading pipe guided to the $GaCl_3$ vessel 10 is identified by the code 11, while the corresponding liquid leading pipe is identified by the code 12.

The purified raw material is supplied to the raw material vessels 10 and 40 from other vessels (not shown in the FIGS.).

The first manufacturing process is the hydrolysis of the $GaCl_3$. The $GaCl_3$ is soluble in water, but does not precipitate. Therefore, the hydrooxide of gallium is provided by adding alkali, as hereinafter explained. First, the $GaCl_3$ is dissolved in distilled water. Clean gas such as, for example, argon, is supplied to the raw material vessel 10 containing the aqueous solution of the $GaCl_3$ via the gas leading pipe 11. The aqueous solution is supplied to the gauge 13 via the liquid leading pipe 12 under pressure, and the desired amount is measured and supplied to the reaction vessel R via the raw material leading pipe 14.

Thereafter, when ammonium hydroxide ($NH_4OH$) is supplied to the reaction vessel R from the raw material vessel 20 via the liquid leading pipe 22, the gauge 23 and the raw material pipe 24, the gallium, which may be thought as an almost amphoteric element, has become insoluble in the water as an ion, and is precipitated. The precipitate is considered as the hydroxide of gallium and is hereinafter indicated as $Ga(OH)_3$. At such time, the ammonium chloride ($NH_4Cl$) exists in the liquid phase and is naturally adhered to the $Ga(OH)_3$ after the liquid is removed. For this reason, the ammonium chloride is removed by washing the $Ga(OH)_3$ with distilled water at a temperature of 70° to 80° C. The distilled water vessel 60 supplies distilled water to the reaction vessel R and this may be accomplished simultaneously with the supply of the aqueous solution of $GaCl_3$. The $Ga(OH)_3$ thus obtained exists as a gel having a comparatively large volume. In accordance with experiments performed by the inventors of the present invention, when the gel of $Ga(OH)_3$ is stationarily placed for 0.5 hour at an almost constant temperature of 80° C., it is aged, thereby reducing its volume. Thereafter, the supernatant liquid is decanted and the $Ga(OH)_3$ is washed by the hot water. Then hydrolysis of $SiCl_4$ and $GeCl_4$ immediately occurs in the reaction vessel R, without drying of the $Ga(OH)_3$. This hydrolysis is a well known reaction wherein the chlorides of Si and Ge react with the water, producing the oxides or hydroxides of Si and Ge, respectively. If the $GeCl_4$ and $SiCl_4$ are individually subjected to the hydrolysis reaction, however, the $SiO_2$ formed by the reaction of $SiCl_4$ is not precipitated in the form of fine powder, but agglomerated in large size, and has an undesirable effect on the succeeding processes.

In the described embodiment of the invention, therefore, the hydrolysis reaction is carried out under the condition that the $GeCl_4$ and $SiCl_4$ are mixed, and in a vessel containing $Ga(OH)_3$ as follows. The specified amount of water is supplied to the reaction vessel R. Argon is supplied to the reaction vessel R by opening the cocks of the gas leading pipes 31 and 41, which are connected to the $SiCl_4$ raw material vessel 30 and the $GeCl_3$ raw material vessel 40, respectively. The liquids in both raw material vessels 30 and 40 are supplied under pressure to the gauge 33 thereby providing the mixed liquid in the specified ratio. Thereafter, the mixed liquid is supplied under pressure to the reaction vessel R and the $SiCl_4$ and $GeCl_4$ are thereby simultaneously subjected to the hydrolysis reaction within said reaction vessel.

$SiO_2$, $GeO_2$ and hydrogen chloride (HCl) are provided by this hydrolysis reaction, according to the following reactions.

After the supernatant liquid is exhausted through a drain pipe 7, the precipitates are washed by water and the by-product HCl is removed. Thus, the oxides, or hydrates, of the of three elements, Si, Ge, and Ga, or their hydroxides remain in the reaction vessel R.

The inventors of the present invention have also confirmed by experiments that the hydrolysis reactions are perfectly carried out unidirectionally in this case and the yield of the oxides or hydroxides is almost 100%. In addition, the $SiO_2$ thus produced exists as a fine powder, mixed uniformly with the $GeO_2$, thereby enhancing the succeeding vitrification process.

In the next process, the oxides or hydroxides of Si, Ge and Ga react with the $H_3PO_4$ and phosphate glass, including these three elements can thus be formed. This process is carried out by adding liquid $H_3PO_4$ to the mixture in the reaction vessel. The $H_3PO_4$ used for the reactions must be of very great purity, in order to manufacture glass material having a very small amount of harmful impurity, which is used as the material of an optical fiber in optical communication. The method of manufacture of the $H_3PO_4$ is hereinafter explained and the method of manufacture of the phosphate is explained as follows.

The $H_3PO_4$ to be supplied to the reaction vessel R may include a water content of about ten and several percent. This phosphoric acid, including such water content, is previously stored in the raw material vessel 50, in the same manner that the other materials are stored in the other raw material vessels, and is then supplied to the reaction vessel R by opening the corresponding cock when required. In this condition, it is difficult to confirm whether the phosphate producing reaction is occurring or not. However, the part 2 of the reaction vessel R is separated from the raw material part 1 of said vessel and then heated in order to remove the extra water content. The part 2 of the reaction vessel is then heated again up to 1400° C. in a furnace. Thereby, the contents ae fused into transparent glass material. Glass fiber may be produced by drawing the glass material from the bottom of the part 2 of the reaction vessel.

Figure 2:
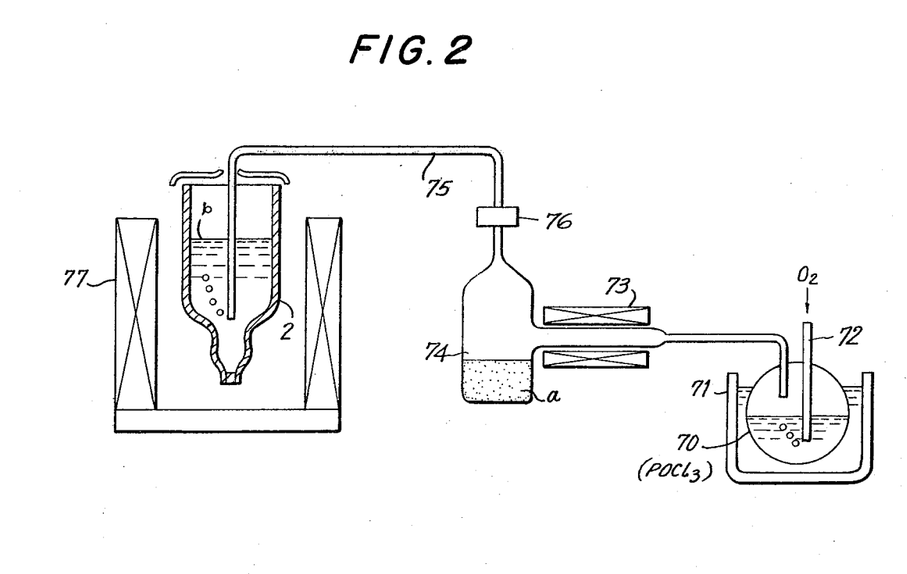
FIG. 2 is a schematic diagram of an embodiment of apparatus used in the dehydration process of the method of the invention.

At such time, dehydration must be performed before spinning in order to manufacture high quality optical fiber. In the described embodiment, dehydration is performed in a manner whereby the chlorine gas and oxygen gas obtained by the oxidation of $POCl_3$ are supplied to the glass material in fusing condition. FIG. 2 illustrates an example of apparatus used for the dehydration process. A $POCl_3$ vessel 70 is housed in the thermostat 71 in FIG. 2. The oxygen gas is supplied under pressure to the $POCl_3$ through an oxygen gas leading pipe 72 and the $POCl_3$ vapor is supplied to a heating furnace 73 which is kept at a high temperature such as, for example, 800° C. using the oxygen gas as a carrier gas. The reaction indicated by the following formula is carried out in the furnace 73, hereinafter referred to as the oxidation furnace, and the chlorine gas is thereby released from the $POCl_3$.

$$POCl_3 + O_2 \rightarrow P_2O_5 + Cl_2$$

The gas containing $P_2O_5$ and $Cl_2$ is guided to a $P_2O_5$ trapping vessel 74 outside the oxidation furnace 73. The $P_2O_5$ is trapped at the bottom a of the trapping vessel 74. The mixed gas of $Cl_2$ and $O_2$ is then guided to the part 2 of the reaction vessel through a dehydration gas leading pipe 75 and supplied under pressure to the fused glass material b. A power rejecting filter 76 prevents mixing of the $P_2O_5$ powder and the fused glass b. A high temperature furnace 77 fuses the glass material and maintains it at a temperature of 1400° C. in the present example. In this condition, the gas supply is continued for about two hours. When the gas supply stops, the furnace 77 is also maintained at 1400° C. for another hour in order to remove bubbles. The glass b is thereby refined. This method offers an extraordinary water removing effect.

According to experimental results of the inventors of the present invention, the measurement of the optical transmission loss of phosphate glass subjected to water removal by the method indicated in FIG. 2 shows that the light absorption loss is due to a hydroxyl radical 1 dB or less, at a wavelength of 0.98 um, which is the absorption band of the hydroxyl radical resulting from the water content. By contrast, if the water content is removed by a supply of oxygen gas, such loss measured 50 dB/km. This proves that a mixing gas of chlorine and oxygen provides an excellent water removing effect. When thionyl chloride ($SOCl_2$) is used instead of the chlorine gas, an effect similar to that obtained by using the mixing gas of $Cl_2$ and $O_2$ may be obtained.

Figure 3:
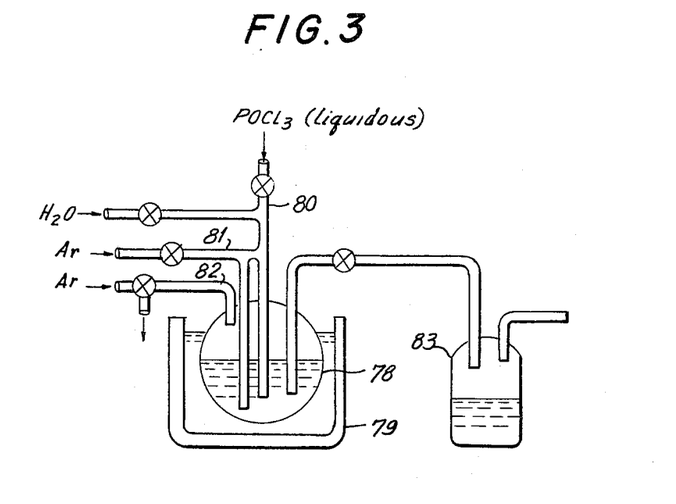
FIG. 3 is a schematic diagram of an embodiment of apparatus used for manufacture of $H_3PO_4$.

A method of manufacture of $H_3PO_4$, which is one of the materials of phosphate glass, is briefly explained with regard to FIG. 3, which shows an embodiment of apparatus used for the manufacture of $H_3PO_4$. Distilled water is initially stored in a quartz reaction vessel 78, housed in a thermostat 79. In this condition, the liquidous $POCl_3$ is gradually added to the distilled water in the reaction vessel through a leading pipe 80 while said reaction vessel is cooled. Thus, $H_3PO_4$ and HCl are produced by the hydrolysis reaction of the $POCl_3$, as indicated by the reaction formula $$POCl_3 + 3H_2O \rightarrow H_3PO_4 + 3HCl.$$

During the reaction, an inactive gas such as, for example, argon, is guided to the liquid via an inactive gas leading pipe 81 and the liquid is stirred. After the required amount of $POCl_3$ is added, the liquid temperature is raised while the argon is being added. Thus, the HCl and excessive water produced by the hydrolysis reaction are vaporized and removed. At such time, since the liquid in the reaction vessel 78 contains a large amount of $H_3PO_4$, its boiling point is much higher than that of water, so that said liquid does not boil even when the temperature exceeds 150° C. Thus, while the argon gas is being added from the inactive gas leading pipe 81, HCl and water are vaporized by a heating process for three hours at the temperature of about 150° C. Thereafter, the argon gas is guided via an argon leading pipe 82 and the $H_3PO_4$ in the reaction vessel 78 is supplied under pressure to a phosphoric acid reservoir 83 and stored therein. According to the experiments performed by the inventors of the present invention, phosphoric acid, including water of 720 g, may be obtained at a concentration of 85% through the reaction of a sufficient amount of distilled water and 1 kg of $POCl_3$.

Figure 4:
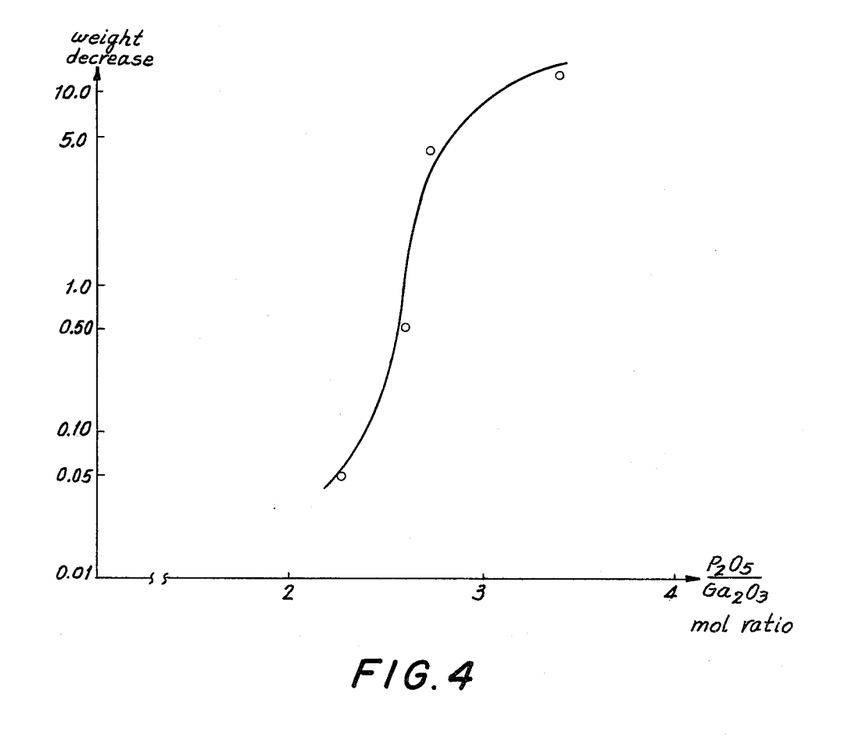
FIG. 4 is a graphical presentation indicating the relation between the mol. ratio of $P_2O_5$ and $Ga_2O_3$ and the water-resistive quality of glass.

The aforedescribed method of manufacture assures the production of highly reliable and low-loss glass material for optical transmission. The inventors of the present invention investigated the water-resistive quality of glass material, which is the most important factor for determining reliability. The results prove that it is desirable to adequately control the containing ratio of the $P_2O_5$ and $Ga_2O_3$ in phosphate glass. FIG. 4 shows the result of testing the relation between the content ratio and the water-resistive quality of glass. In this glass, the content ratio of $GeO_2$ is maintained in a range of 10 to 25%, while that of $SiO_2$ is maintained in a range of 0 to 10%. In FIG. 4, the abscissa represents the mol ratio of $P_2O_5/Ga_2O_3$ and the ordinate represents the weight decrease in percent of the glass in the water-resistive quality test.

As shown in FIG. 4, when the mol ratio is about 2.4 or less, the weight decrease becomes about 0.05%, which is almost equal to that of silicate glass including the dopant. The water resistive quality test method conforms to R3J02 of the (Japanese Industrial Standard, or JIS, and the weight decrease of glass powder is measured after the powder of the sample glass is boiled in the water for specified period.

Figure 5:
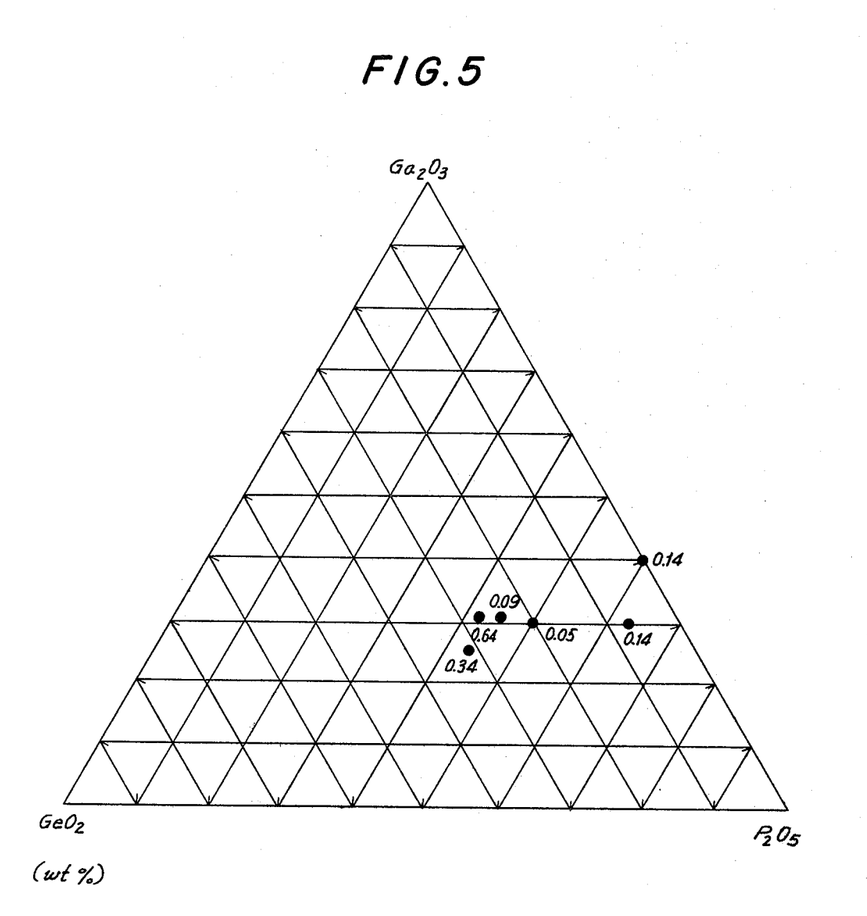
FIG. 5 is a trilinear coordinate indicating the relation between the glass composition and water-resistive quality in examples of glass manufactured by the method of the invention.

FIG. 5 is a graphical presentation of the relation of the constitution and water resistive quality of three-element glass of the phosphate system manufactured by the method of the present invention. When the content ratio of $Ga_2O_3$ is 20% or more, excellent water resistive quality is attained. These constitutions of glass are calculated at the time of preparing the raw materials of the glass in the method of manufacture of the invention.

As is obvious from the foregoing explanation, the constitution of raw material of glass prepared for the method of manufacture of the invention provides a mol ratio between $P_2O_5$ and $Ga_2O_3$ of 2.7 or more, judging from the reliability of the manufactured glass. It is recommended that the raw materials be prepared as indicated in the following table for the constitution of glass including $SiO_2$, in addition to $P_2O_5$, $Ga_2O_3$ and $GeO_2$.

| Component | Range of content (weight %) |
| --- | --- |
| $P_2O_5$ | 45 to 55 |
| $Ga_2O_3$ | 20 to 35 |
| $GeO_2$ | 10 to 25 |
| $SiO_2$ | 0 to 10 |

Figure 6:
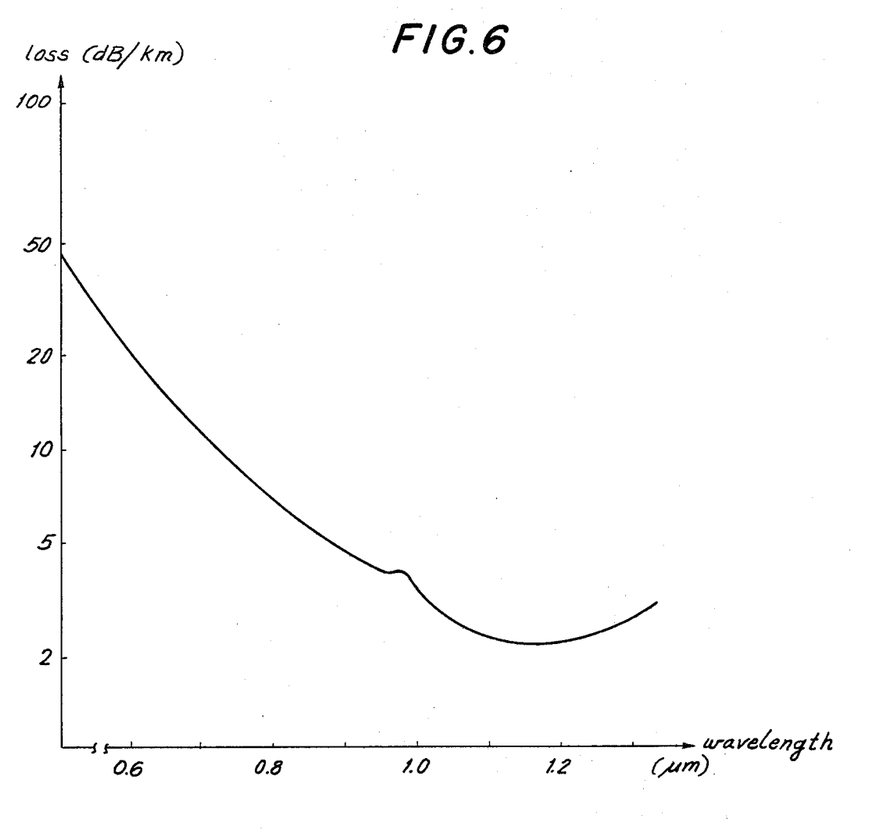
FIG. 6 is a graphical presentation indicating the spectrum of light transmission loss in an embodiment of glass manufactured by the method of the invention.

FIG. 6 shows the optical transmission loss spectrum of an embodiment of cladded type optical fiber utilizing the phosphate glass and a core manufactured by the method of the present invention. The abscissa of FIG. 6 represents the wavelength in μm and the ordinate represents the loss in dB/km. The loss at a wavelength of 0.98 μm is 5 dB/km or less. The cladding glass used for this optical fiber is phosphate glass which includes a minute amount of boron trioxide ($B_2O_3$) for improving the fusible characteristic, in addition to $Ga_2O_3$, $Al_2O_3$ and $SiO_2$. The values of the physical characteristics and the water resistive qualities of different glass specimens forming the core and cladding of an optical fiber manufactured for the test are indicated in the following table.

|  | Physical | Refractive nature index |  |  |
| --- | --- | --- | --- | --- |
| Application | | Thermal expansion coefficient | Glass transition temperature | Softening temperature | Water resistive quality (weight decrease rate) |
| Core | 1.568 | $64 \times 10^{-7}/°C$ | 674° | 815° C. | 0.05% |
| Cladding | 1.521 | $58 \times 10^{-7}/°C$ | 715 | 785 | 0.06 |

The constitutions of the core and cladding of the different test glass specimens are shown in the following table. However, the content ratio of each component is interpreted with respect to that of the oxides indicated in the following table.

| Component | Content ratio (weight %) | Content ratio (mol %) |
| --- | --- | --- |
| Core glass | | |
| $P_2O_5$ | 51.5 | 50.0 |
| $Ga_2O_3$ | 30.0 | 22.1 |
| $GeO_2$ | 14.9 | 19.6 |
| $SiO_2$ | 3.6 | 8.3 |
| Cladding glass | | |
| $P_2O_5$ | 61.0 | 50.0 |
| $Ga_2O_3$ | 12.1 | 7.5 |
| $Al_2O_3$ | 11.0 | 12.5 |
| $SiO_2$ | 13.1 | 25.4 |
| $B_2O_3$ | 2.8 | 4.6 |

The $Al_2O_3$ and $B_2O_3$ which are included with the cladding glass components, but not with the core glass components in the foregoing table, may also be manufactured by hydrolysis reaction of the halogen compound. The cladding glass may therefore be manufactured by the same method as the core glass.

It is apparent from the investigations of the inventors of the present invention that in phosphate glass containing a trivalent positive element other than Ga, such as the cladding glass of the foregoing table, the water resistive quality of glass is governed by the sum of the content of $P_2O_5$ and the content of oxides of all trivalent positive elements. The constitution of the cladding glass was selected as a result of experiments based on this concept. This constitution permits the manufacture of an optical fiber having a considerably high numeric aperture such as, for example, a numeric aperture of 0.4, through combination with the core glass listed in the foregoing table.

Since it is desirable that the liquid raw materials be extremely pure, it is preferable that the purified raw materials be supplied to the respective raw material vessels in mass production without exposure to the open air by direct connection of the purifying apparatus of the respective liquids to the vessels of raw materials, ammonia solution and water shown in FIG. 1. Since the compounds used for forming the glass are all produced by a reaction in water, loss of phosphorum due to vaporization does not occur and, furthermore, the product yield is excellent in the method of manufacture of the invention. Since a large amount of raw material can be offered for reaction as compared with the method using the gas phase chemical reaction, the glass forming compounds may be formed with extraordinarily high efficiency. The method of the present invention thus offers excellent advantages when it is adopted to the manufacture of glass material in the mass production of optical elements such as optical fibers and lenses of prisms using phosphate glass as the material.

While the invention has been described by means of a specific example and in a specific embodiment, we do not wish to be limited thereto, for obvious modifications will occur to those skilled in the art without departing from the spirit and scope of the invention.

We claim:

1. A method of manufacturing glass for an optical transmission body, said method comprising the steps of
   precipitating an oxide of at least one glass forming element by the hydrolysis reaction of a halogen compound of said glass forming element in the liquid phase to provide a precipitate;
   producing a phosphate including said glass forming element by adding a liquidous phosphoric acid to said precipitate to provide a product;
   removing the water from said product containing said phosphate; and
   thereafter vitrifying said phosphate by heating.

2. A method as claimed in claim 1, wherein said glass forming element is selected from the group constituting gallium, germanium and silicon.

3. A method as claimed in claim 1, wherein said phosphoric acid is obtained by removing hydrogen halogenide from the reaction product of the hydrolysis of a halogen compound of phosphorum, and adding said phosphoric acid to the precipitate of the reaction.

4. A method as claimed in claim 1, further comprising mixing halogen compounds of silicon and germanium, to provide a mixture, prior to said precipitating of said oxide, and wherein said precipitating of said oxide is by the hydrolysis reaction of said mixture in the liquid phase.

5. A method of manufacturing glass for an optical transmission body, said method utilizing a reaction vessel and comprising the steps of
   producing gallium hydroxide by adding ammonia to an aqueous solution of gallium trichloride;
   producing a hydrated oxide of a semiconductor element by the hydrolysis reaction of a halogen compound of said semiconductor element in the liquid phase;
   mixing said hydrated oxide of said semiconductor element and said gallium hydroxide by producing said hydrated oxide of said semiconductor element and said gallium hydroxide in said reaction vessel to provide a mixture;
   producing phosphates of said gallium hydroxide and said hydrated oxide of said semiconductor element by adding liquidous phosphoric acid to said mixture to provide a product;
   removing the water from said product containing said phosphates; and
   thereafter vitrifying said phosphates by heating.

* * * * *